April 4, 1967  W. D. JONES  3,312,300
POWER-OPERATED UTILITY CART
Filed Nov. 2, 1964  3 Sheets-Sheet 1

INVENTOR.
WILLIAM D. JONES

BY *B. P. Tishelman, Jr.*
ATTORNEY.

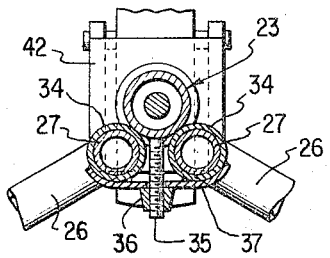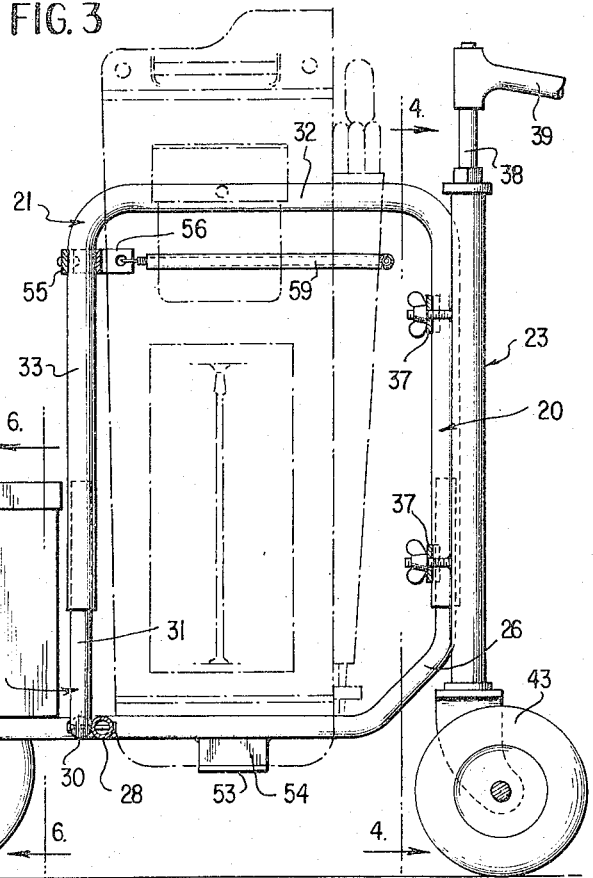

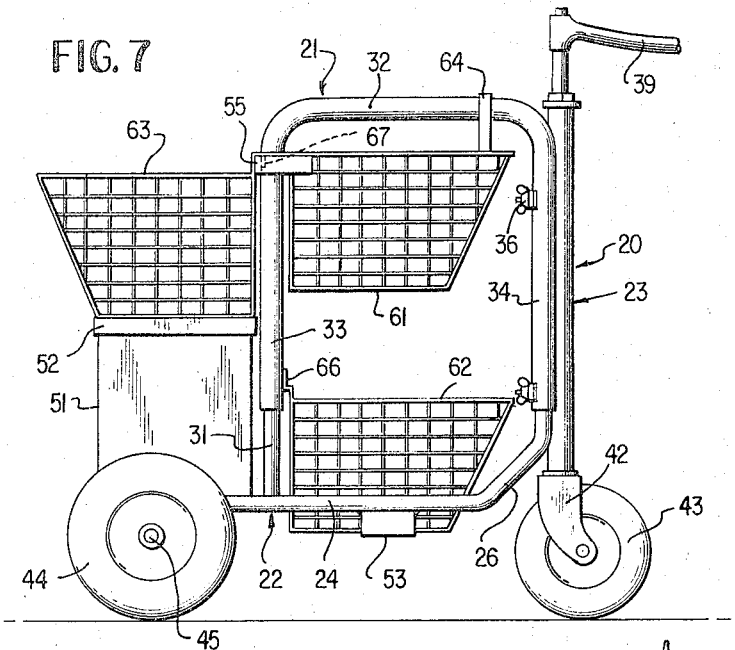
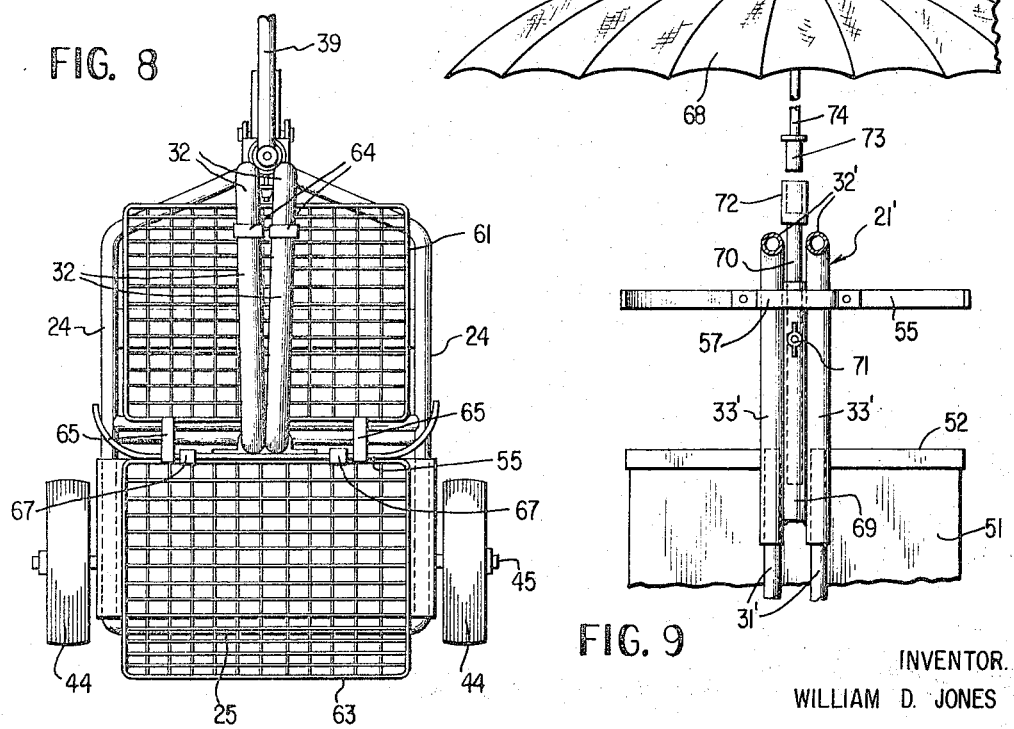

United States Patent Office 3,312,300
Patented Apr. 4, 1967

3,312,300
POWER-OPERATED UTILITY CART
William D. Jones, E. Club Drive,
Thomasville, Ga. 31792
Filed Nov. 2, 1964, Ser. No. 408,273
6 Claims. (Cl. 180—19)

This invention relates to vehicles of that class which are steered by a walking attendant, and more particularly to a power-operated utility vehicle or cart.

A general object of the invention is to provide a vehicle of the above-mentioned type which is economical to build, reliable and efficient in operation, very sturdy, and highly versatile in its usage.

Another object of the invention is to provide a preferably electric-powered vehicle which is steered by a walking attendant and which may be operated at various speeds within the normal walking range.

Another object is to provide a vehicle of the mentioned type which may serve as a golf cart accommodating two golf bags, as a mail delivery cart for post office employees, or as a merchandise cart in warehouses, stock bins, stores and the like, as well as other desirable uses.

Another object of the invention is to provide a vehicle of the mentioned type having a novel and simplified frame structure which is rugged and durable and easy to set up and separate for storage or the like.

Other objects and advantages of the invention will be apparent during the course of the following detailed description.

Figure 1:
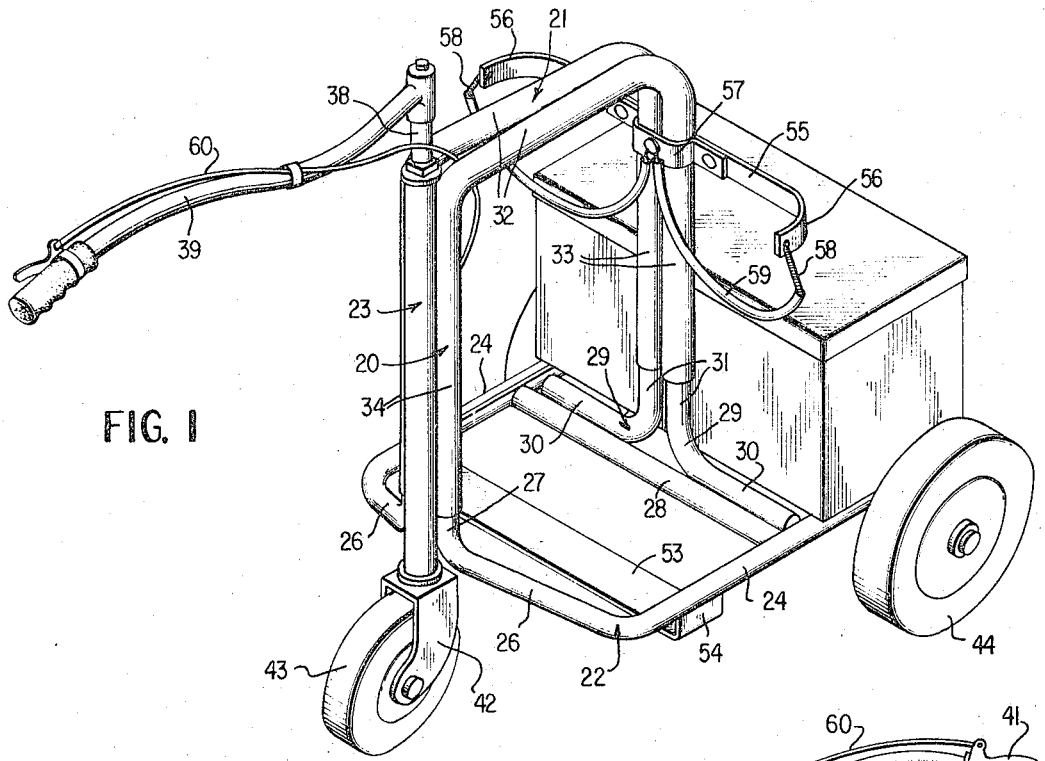
Figure 2:
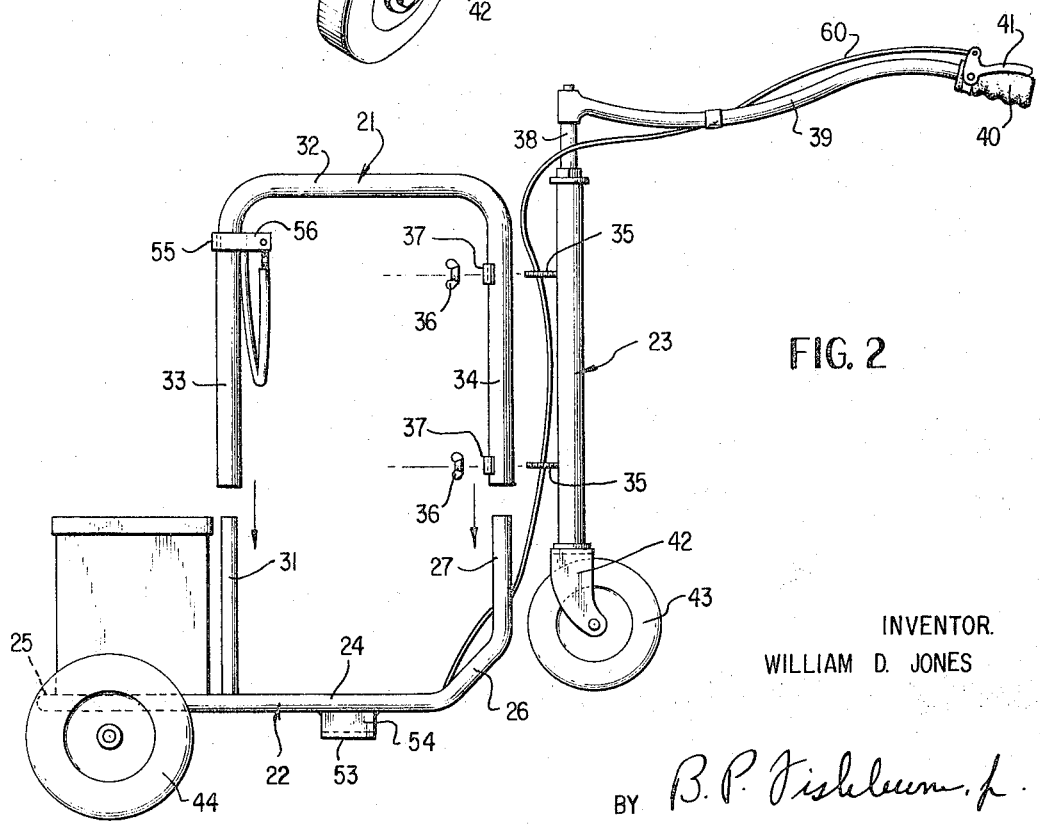

In the accompanying drawings forming a part of this application and in which like numerals are employed to designate like parts throughout the same, FIGURE 1 is a perspective view of a utility vehicle embodying the invention, FIGURE 2 is an exploded side elevational view thereof, FIGURE 3 is an enlarged side elevational view of the vehicle with parts in section and parts broken away and illustrating in broken lines the use of the vehicle as a golf cart, FIGURE 4 is a vertical section taken on line 4—4 of FIGURE 3, FIGURE 5 is a fragmentary horizontal section taken on line 5—5 of FIGURE 4, FIGURE 6 is a fragmentary vertical section taken on line 6—6 of FIGURE 3, FIGURE 7 is an additional side elevation of the vehicle showing the use thereof as a cart for merchandise, mail or the like, FIGURE 8 is a plan view of the vehicle as shown in FIGURE 7, and FIGURE 9 is a fragmentary vertical sectional view showing a modification of the invention to accommodate an umbrella.

In the drawings, wherein for the purpose of illustration are shown preferred embodiments of the invention, attention is directed first to FIGURES 1–6 inclusive, wherein the numeral 20 designates a main frame including a top section 21, a bottom section 22 and a vertical steering column section 23, said frame sections being separable as depicted in FIGURE 2.

The bottom frame section 22 is generally horizontal and includes side longitudinal parallel bars 24, preferably integrally connected at their rear ends by a horizontal transverse bar 25. The bottom frame section 22 further comprises forward converging and upwardly inclined extensions 26 on the forward ends of bars 24, each in turn carrying at its forward end an upstanding vertical post extension 27 integral therewith. The entire frame section 22 is preferably formed from suitably rigid tubing, as shown, as is the entire main frame of the vehicle.

Near its longitudinal center, FIGURES 1 and 3, the bottom frame section 22 has a horizontal cross brace 28 suitably rigidly secured to the longitudinal bars 24, and immediately rearwardly of the brace 28 a pair of L-shaped bars or members 29 have their lower horizontal portions 30 suitably rigidly secured to the bars 24 and/or brace 28 and their vertical extensions 31 projecting upwardly in closely spaced parallel relation near the transverse center of the main frame. The tops of the vertical extensions 27 and 31 terminate at the same elevations near the vertical center of the assembled main frame as depicted in FIGURE 3, for example.

The top frame section 21 is inverted U-shaped and vertically disposed at the transverse center of the vehicle and is quite narrow transversely to occupy a minimum of space laterally. The top section 21 consists of two companion parts, as shown, having top horizontal longitudinal bars 32 which are approximately parallel and integral depending vertical legs 33 and 34 adapted to telescope over the extensions 31 and 27.

Immediately forwardly of legs 34 and vertical extensions 27, the vertical steering post or column 23 is nested between the legs 34 and contacts the same tangentially in a triangular relationship as best shown in FIGURES 1 and 5. The post 23 has vertically spaced horizontal screw-threaded studs 35 rigidly secured thereto by welding or the like, and these studs extend through the space between the legs 34, FIGURES 4 and 5, and receive winged nuts 36 which bear against suitable clamp brackets 37, serving to hold the elements 34 and 23 in securely assembled relation, as shown in the drawings. The brackets 37 may, if preferred, be permanently welded to the legs 34 of upper frame section 21, as illustrated.

The column or post 23 is tubular, and journaled therein is a suitable vertical steering shaft 38 having an elongated generally horizontal steering handle 39 rigidly secured to its upper end including a forward hand grip 40 and a pivoted control lever 41 immediately adjacent thereto. The lower end of the steering shaft 38 has a fork 42 between the sides of which is conventionally journaled a free rolling rubber tired front steering wheel 43.

The rear end of the vehicle is supported by a pair of rubber tired wheels 44, somewhat larger than the wheel 43 and mounted upon a rear transverse axle 45, journaled in bearings 46 which depend from the longitudinal frame bars 24 and are suitably rigidly secured thereto. One wheel 44 is keyed as at 47 to the axle 45 to furnish driving power. The axle is driven by a conventional gear head motor 48, operatively connected therewith at the center of the axle and powered in a conventional manner by an automotive-type storage battery 49 which may have a conventional battery charger 50 associated therewith. The battery charger may be of the type having an extension cord, not shown, to operate from any 110-volt A.C. outlet. The charger may be omitted entirely, if desired. The aforementioned power units are all housed and mounted within a sturdy rectangular box 51 which rests upon the rear end portion of bottom frame section 22 above the driving axle 45 and just rearwardly of extensions 31.

The box 51 has a flat removable top cover 52, and the box and cover are sufficiently sturdy to serve as a seat so that a golfer or the like may rest whenever desired. In this connection, the top of the box is at a convenient elevation for the seating of an adult. The box 51 is suitably rigidly connected with the underlying frame section 22 and extends between the side frame bars 24, as shown in FIGURE 6 for example.

A sturdy horizontal transverse plate 53 spans the bottom frame section 22 transversely midway between the extensions 27 and 31 and has vertical end portions 54 welded or otherwise rigidly secured to the bars 24. The plate 23 is at an elevation slightly below the longitudinal bars 24. The plate receives and supports the bottoms of a pair of golf bags on opposite sides of the frame section 21 as depicted by broken lines in FIGURE 3.

To further stabilize the golf bags, a transverse horizontal arm 55 having curved ends 56 to embrace the bags is rigidly clamped by a bracket 57 to the assembled legs 33 near the tops thereof. Resilient spring straps 58 preferably covered by plastic tubing 59 are connected at the ends of arm 55 and with the bracket 57, as shown. The straps encircle and support the golf bags near their tops as depicted in FIGURE 3. The golf bags are thus securely held on the cart. They rest upon the plate 53 which bears their weight and their inner sides engage the sturdy longitudinal bars 32 of the main frame. The bags are constrained from forward and rearward tilting by the rigid arm 55 and the encircling straps 58. The arrangement is highly compact and simplified.

The aforementioned pivoted control lever 41 is connected with a conventional control cable 60, leading along the handle 39 and main frame to a suitable conventional rheostat-type control for the gear head motor unit 48, not shown. Such controls are entirely conventional and well-known in the art and need not be shown or described herein. It is desired not to limit this invention to any particular form of control means and any conventional type of control will suffice. In any event, the speed of the vehicle is preferably regulated by means of the lever 41 adjacent the hand grip 40, whereby the vehicle may be fully controlled and steered with one hand by a walking attendant such as a golfer.

FIGURES 7 and 8 of the drawings illustrate the manner in which the cart or vehicle may be employed for mail delivery or for merchandise transporting or like usage. For these adaptations, there is no significant change whatsoever in the vehicle frame structure previously described, which is the essence of the invention. As shown in these FIGURES 7 and 8, the identical vehicle previously described in connection with FIGURES 6-6 may carry three wire baskets 61, 62 and 63 in the novel and compact manner shown. As depicted in FIGURE 8, these baskets may span substantially the entire width of the vehicle but they are preferably no wider than the distance between the frame bars 24, as shown. The upper front basket 61 has suspension hooks or straps 64 engaging over the bars 32 and suitable rear bracket means 65 engaging previously-described cross arm 55. The spring straps 58 for encircling golf bags are omitted.

The lower basket 62 is cradled upon the plate 53 between bars 24. It may further have a top extension 66 to engage the legs 33 for stability. The rear basket 63 rests directly upon the box 51 and may have hooks 67 to engage the cross arm 55 for stability. The baskets may have plastic or waterproof liners and/or covers, not shown, for the purpose of protecting contents, such as mail. It may be seen that the frame structure of the vehicle lends itself to a variety of practical applications without structural change.

FIGURE 9 shows a slight modification of the vehicle frame structure, enabling it to support an umbrella 68 for protection outdoors from the elements. In this figure, the upper frame section 21' is modified slightly in comparison to the frame section 21. The legs 33' and extensions 31' and horizontal bars 32' are spread apart somewhat more than in the prior form of the invention, FIGURE 1. This permits the mounting of a vertical tube section 69 between the legs 33', preferably welded thereto. A vertical shaft or rod 70 is received telescopically and adjustably in the tube 69 and is held therein by a set screw 71 or the like. A socket element 72 on the top end of shaft 70 receives a plug 73 of umbrella shaft 74 removably. In all other respects, the structure in FIGURE 9 is identical to that shown and described in FIGURES 1-8.

It is thought that the utility of the invention and its advantages and economies will now be fully apparent to those skilled in the art without the necessity for any further description.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A multiple use cart of the type guided by a walking attendant comprising a bottom generally horizontal frame section having spaced longitudinal bars, a rear cross bar and front inclined converging portions terminating in closely spaced upright extensions, another pair of upright extensions on the bottom frame section longitudinally rearwardly of the first-named extensions near the longitudinal center line of the bottom frame section and forwardly of the rear end thereof, vertically disposed inverted U-shaped top frame sections including longitudinally spaced depending tubular legs engaging telescopically over the first and second-named extensions, said top frame sections constituting a narrow structure longitudinally of the cart at the longitudinal center line thereof, front steering wheel means secured to the forwardmost tubular legs of the top frame sections and including a steering handle to be operated by a walking attendant, rear axle means supporting the rear end of the bottom frame section, and a box secured upon the rear end portion of the bottom frame section immediately rearwardly of the rear side of the top frame sections adapted to contain power components and having a top serving as a seat, said top near the vertical center of the frame composed of said bottom and top frame sections.

2. The invention as defined by claim 1, and a transverse horizontal support member on the bottom frame section and somewhat below said longitudinal bars and attached dependingly thereto substantially midway between the forward and rear legs of the top frame sections and said upright extensions, and a substantially rigid transverse horizontal arm attached to the rear legs of the top frame sections and projecting substantially equidistantly upon opposite sides thereof.

3. The invention as defined by claim 2, and golf bag encircling straps connected with said horizontal arm to stabilize a pair of golf bags resting on said support member and on opposite sides of the top frame sections.

4. A three-wheeled utility vehicle of the type guided by a walking attendant comprising a bottom generally horizontal frame section including a transverse horizontal article supporting member, an upstanding laterally narrow top frame section secured to the bottom frame section at the longitudinal center line thereof and extending longitudinally of the bottom frame section from the front end thereof to a point intermediate the ends of the bottom frame section, the top frame section being generally inverted U-shaped and having forward and rear legs, a vertical steering post secured to the forward legs of the top frame section immediately forwardly of the bottom frame section, a front steering wheel shaft and steering handle assembly journaled within said steering post, a rear transverse axle secured to the rear end portion of the bottom frame section rearwardly of the rear side of the top frame section, a pair of rear wheels on said axle outboard of the sides of the bottom frame section, a laterally elongated rectangular box secured on the rear end portion of the bottom frame section adapted to contain power drive means for said rear axle, and a horizontal cross arm on said top frame section at the rear side thereof and near the top thereof and extending on opposite sides of the top frame section for approximately the full width of the bottom frame section and also disposed rearwardly of said article supporting member.

5. The invention as defined by claim 4, and flexible strap means associated with said cross arm for encircling and supporting a pair of golf bags resting upon said article supporting member.

6. The invention as defined by claim 4, and wherein the bottom frame section, top frame section and steering post are separately formed elements detachably secured together in assembly.

References Cited by the Examiner

UNITED STATES PATENTS

| | | | |
|---|---|---|---|
| 2,696,272 | 12/1954 | Schlaphoff. | |
| 2,706,008 | 4/1955 | Voigt | 180—19 |
| 2,962,106 | 11/1960 | Burnside et al. | 180—19 |
| 3,094,187 | 6/1963 | Horowitz | 180—19 |

BENJAMIN HERSH, *Primary Examiner.*

J. A. PEKAR, *Assistant Examiner.*